United States Patent [19]
Solleder et al.

[11] Patent Number: 6,011,680
[45] Date of Patent: Jan. 4, 2000

[54] CONNECTOR, IN PARTICULAR A PLUG-IN CONNECTOR FOR TT AND TN NETWORKS

[75] Inventors: Reinhard Solleder, Lappersdorf; Reinhard Schmid, Regensburg, both of Germany

[73] Assignee: Siemens AG, Munich, Germany

[21] Appl. No.: 09/101,915

[22] PCT Filed: Jan. 8, 1997

[86] PCT No.: PCT/DE97/00011

§ 371 Date: Nov. 13, 1998

§ 102(e) Date: Nov. 13, 1998

[87] PCT Pub. No.: WO97/26698

PCT Pub. Date: Jul. 24, 1997

[30] Foreign Application Priority Data

Jan. 19, 1996 [DE] Germany .................... 196 01 884

[51] Int. Cl.[7] ............................................. H02H 3/00
[52] U.S. Cl. ......................... 361/90; 361/23; 361/115
[58] Field of Search ........................... 361/90, 23, 115, 361/103, 105, 100

[56] References Cited

U.S. PATENT DOCUMENTS

| | | | |
|---|---|---|---|
| 5,519,561 | 5/1996 | Mrenna et al. | 361/105 |
| 5,555,483 | 9/1996 | Pressman et al. | 361/90 |

FOREIGN PATENT DOCUMENTS

| | | | |
|---|---|---|---|
| 354551 | 1/1980 | Austria | H02H 3/16 |
| 0 387 837 | 9/1990 | European Pat. Off. | H02H 3/20 |
| 0 641 045 | 3/1995 | European Pat. Off. | H01R 13/713 |
| 2 704 686 | 11/1994 | France | H01H 83/06 |
| 38 03 582 | 8/1989 | Germany | H02H 3/00 |
| 93 10 675 | 10/1993 | Germany | H02H 3/10 |
| 93 12 528 | 11/1993 | Germany | H01R 13/70 |
| 44 01 406 | 7/1995 | Germany | H02J 13/00 |
| 195 07 039 | 10/1995 | Germany | H02J 13/00 |
| 44 25 876 | 1/1996 | Germany | H02J 13/00 |
| 44 28 007 | 2/1996 | Germany | G01R 15/12 |
| 44 29 950 | 2/1996 | Germany | H01H 83/14 |
| 295 19 212 U | 3/1996 | Germany | G01R 31/02 |
| 4-355627 | 12/1992 | Japan | H02H 11/00 |
| 2 249 229 | 4/1992 | United Kingdom | H02H 11/00 |
| WO 94/13078 | 6/1994 | WIPO | H04L 5/16 |

OTHER PUBLICATIONS

T. Novak et al., "Technological Innovations in Deep Coal Mine Power Systems", 1995 IEEE, pp. 2008–2016.

*Primary Examiner*—Stephen W Jackson
*Attorney, Agent, or Firm*—Kenyon & Kenyon

[57] ABSTRACT

Connector, in particular a plug-in connector for TT and TN networks, in which an electronic monitoring and control unit supplied with a voltage switches through conductors or releases the connection, by means of a switching device, from the supply side to the load side of the connector as a function of information or measured data. Potential-measuring devices measure conductor potentials continuously or at regular intervals on the supply side and/or on the load side, and the switch is activated if the result falls short of or exceeds specific limits. Also, the electronic monitoring and control unit is designed to generate a signal if the connection is briefly released or established a certain number of times within a predetermined period;

the conductors to be switched through are monitored by a fault current detecting device which acts upon the switching device; and information and/or command data are present at a bus interface.

8 Claims, 1 Drawing Sheet

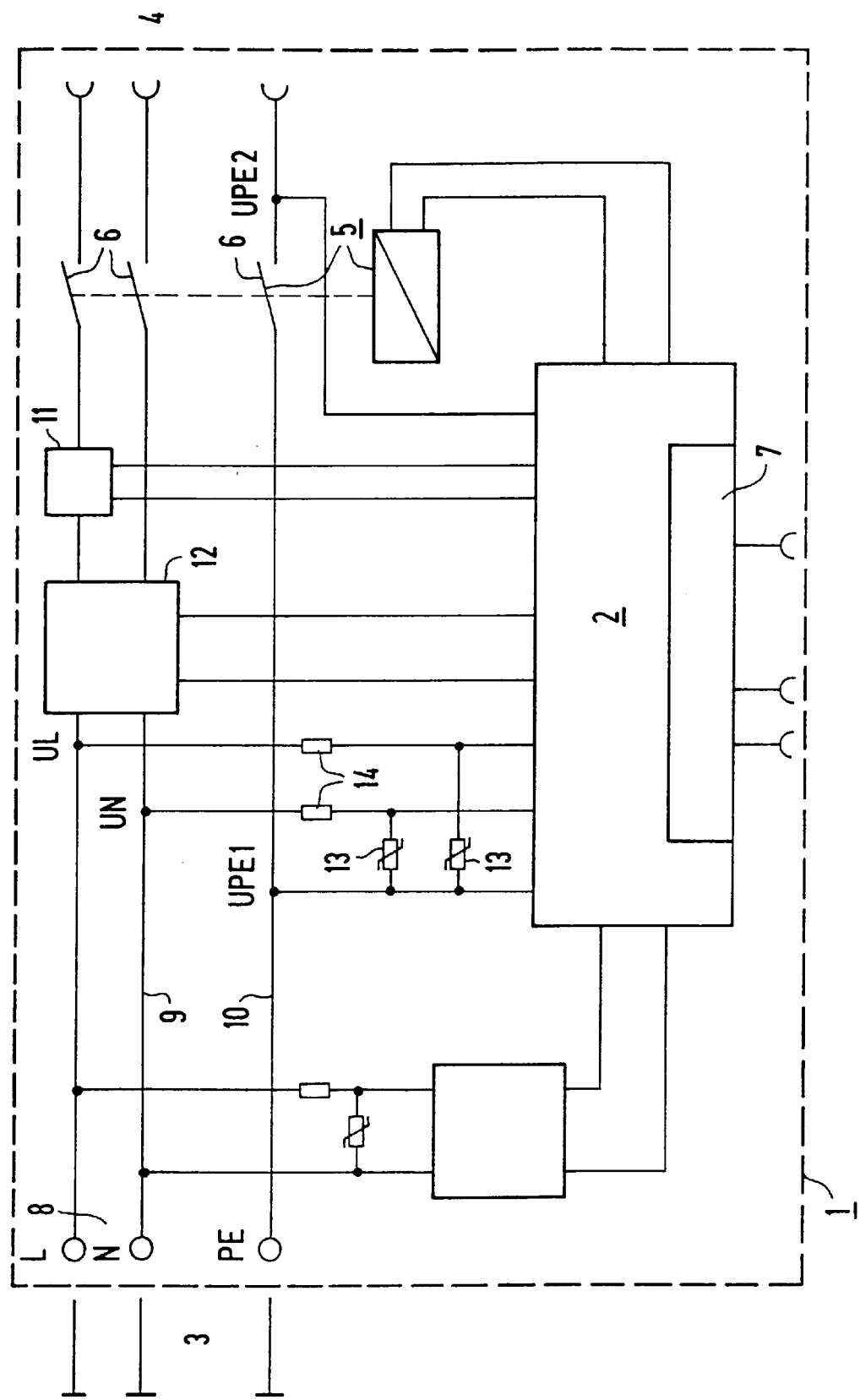

CONNECTOR, IN PARTICULAR A PLUG-IN CONNECTOR FOR TT AND TN NETWORKS

FIELD OF THE INVENTION

The present invention related to a connector, in particular a plug-in connector for TT and TN networks, in which an electronic monitoring and control unit supplied with a voltage switches through conductors and releases the connection by means of a switching device, from the supply side to the load side of the connector as a function of information or measured data.

BACKGROUND INFORMATION

In deep coal mining, concepts have been developed to provide power system which perform functions such as conductor supply and/or load side potential measuring and fault current monitory and actuation of a switch device when certain conditions occur. See Record of the Industry Applications Conference (IAS), Orlando, Oct. 8–122, 1995, Vol. 3, Oct. 3, 1995, IEEE, pp. 2009–2012, XP000547126, Novak, T., et al., "Technological Innovations in Deep Coal Mine Power Systems," esp. FIG. 1).

V-E 0100 defines a TT network as a type of network in which overcurrent-, fault-current- and fault-voltage-operated protective devices can be used. TN networks are the most common, with overcurrent- and fault-current-operated protective devices being used. All elements are connected by means of a separate conductor, the PE conductor, which performs the protective function. Even though national and international regulations exist for setting up and testing electrical power systems, it is occasionally not possible in practice to prevent power systems from demonstrating deficiencies that can result in accidents or fire. In most cases, effective protection could be provided by using fault-current-operated protective devices, especially with low rated fault currents of 30 mA or 10 mA. However, these types of protective devices are not yet prescribed nationally or internationally for all fields of application.

According to current concepts in structural systems engineering, opening and closing commands can be supplied to specially designed receptacles via a bus. These types of switching commands may result in dependence on measurement results and information processing systems See e.g., (German Patent No. U-9 312 528). In this regard, certain functions, such as current-limiting functions, can even be transferred to the receptacle, which are then referred to as intelligent receptacles. German Patent No. 4 425 876 describes an intelligent receptacle of this type which includes a connector which has a bus interface. Here, the power line is used as the bus.

Other concepts provide the receptacles with child-proof mechanisms, or mechanical latches, which provide access to the current-conducting leads only when a suitable plug is inserted.

SUMMARY

An object of the present invention is to pursue the idea of the intelligent receptacle and to generally develop a connector, which can be a receptacle, taking into account the most frequent and hazardous deficiencies of these devices and protecting downstream equipment and personnel.

According to the present invention, an arrangement is provided in which potential-measuring devices measure conductor potentials continuously or at regular intervals on the supply and/or load side. The switching device is actuated if the result falls short of or exceeds specific limits, thereby releasing the connection, if it was previously established. When a load is connected for the first time, the conductor is or is not switched through as a function of the measured values. The potential should be measured on the supply and load sides of the contact gap, especially in the case of protective conductors. This helps detect defective or interrupted protective conductors. It is possible to establish both minimum and maximum limits in order to check for proper connection, intact conductors and whether the protective conductor is set to ground potential. The conductors to be switched through are also monitored by a fault current detecting device. The fault current also serves as a criterion for reversed conductors, especifially for the hazardous reversal of the external conductor, L-conductor or protective conductor (PE conductor).

The electronic monitoring and control unit is also designed to generate a report when the connection is briefly released a certain number of times.

The conductors to be switched through are also monitored by a fault current detecting device. The fault current also serves as a criterion for reversed conductors, especially for the hazardous reversal of the external conductor, L-conductor or protective conductor (PE conductor).

Information and/or command data can be present at a bus interface of the connector.

One example embodiment of the connector according to the present invention can be used to advantageously test the protective conductor (PE conductor), making it possible to detect insufficiently conductive connections and broken protective conductors, which are especially hazardous.

In a further refinement, a surge suppressor according to the present invention protects the fault-current-operated protective device of the connector against false tripping. At the same time, the surge suppressor protects the power supply unit and electronic components against voltages in the usual manner. Voltage-dependent resistors of the surge suppressor can, in turn, be protected by series resistors.

The connector, which can function with screwless terminals, screw-type terminals or plug-in mechanisms, can be built into a stationary load unit along with its functions. This arrangement tests a permanently connected apparatus or a load in general, including the supply conductors, providing protection against otherwise unnoticed and possibly hazardous damage in that the connector does not switch the conductor through, or releases the connection, when irregularities are detected.

BRIEF DESCRIPTION OF THE DRAWINGS

The FIGURE shows an example embodiment of the present invention; in particular, an intelligent receptacle in a 1+N system is shown.

DETAILED DESCRIPTION

As shown in the FIGURE, a connector 1 includes an electronic monitoring and control unit 2 supplied from the mains voltage which, using a switching device 5, connects a supply side 3 through to a load side 4, or releases the connection, by opening switching contacts. Switching contacts 6 are actuated via a bus interface 7 as a function of information data and by electronic monitoring and control unit 2 as a function of measured data. The measured data is derived in a special way from potentials on supply side 3 and/Dr from potentials on load side 4 as well as from the current flow.

Potential-measuring devices on supply side 3 and/or on load side 4 measure conductor potentials continuously or at regular intervals. In the example embodiment, these potentials are voltage UL of external conductor 8, previously called the phase conductor, and voltage UN of neutral conductor 9, both of which are on supply side 3 in the embodiment. Voltage UPE1 of protective conductor (PE) 10 on the supply side and voltage UPE2 of the protective conductor on load side 4 are also measured. The potential measurement, which takes the form of potential differences, does not require a reference potential and is carried out, for example, in the same manner as when using isolation amplifiers in metrology. Aside from the protective circuit elements, the potential-measuring device is largely integrated into electronic monitoring and control unit 2, which checks potentials UL, UN, UPE1 and UPE2 on the supply and load sides to see whether the result falls short of or exceeds specified limits. Within the permissible range, switching device 5 connects the conductor through, and within the impermissible range, which can lead to hazardous conditions, the connection is not established or it is released, depending on the operating state of connector 1.

An all-pole connection is established in particular only when electronic monitoring and control unit 2 does not detect an error or deficiency on supply side 3, i.e. in the line-side connection. If an error or deficiency is detected, the electronic monitoring and control unit disconnects all poles.

In the example embodiment as a receptacle, for example, the connector can be also designed in such a way that a current sensor 11 measures the current intensity taken from a load and transmits it to a bus via bus interface 7 for further processing in a user station. Accordingly, the operating state of a connected load can be transmitted as an on or off state. Alternatively, the on or off state of the connector itself can be transmitted or received via the bus in the form of a command. A connector of this type can be used for load management purposes.

Another important consideration is the fact that the electronic monitoring and control unit is designed to generate a signal when the connection is briefly released or established a certain number of times within a predetermined period. This makes it possible to detect poor contact connections, such as loose contacts, and to perform a shutdown operation on the basis of this unsafe operating state. A fault current detecting device 12 monitors conductors 8 and 9 to be switched through. With conductors monitored in this manner, fault current is also used as a criterion for reversed conductors. In the embodiment, fault current detecting device 12 checks external conductor 8 and protective conductor 10 to see if they are reversed. It also checks neutral conductor 9 and protective conductor 10.

In general, connector 1 can send information data to bus interface 7 and receive command data from a bus and command-issuing user stations via the bus interface. The limit values for the measurement results generated by the potential-measuring device can, in particular, satisfy the following condition:

$$0.01 \text{ V} < (UN-UPE1) < (UL-UN) \times 0.1$$

or $$0.01 \text{ V} < (UN-UPE1) < 50 \text{ V},$$

where UL represents the voltage of an external conductor (or phase conductor according to the old designation), UN the voltage of the neutral conductor and UPE1 the voltage to reference potential of the protective conductor on the supply side.

Electronic monitoring and control unit 2 can be designed, in particular, to generate a signal when a certain number of interruptions occur during a comparatively short length of time within a certain longer period. Electronic monitoring and control unit 2 can also be designed, in particular, to generate a signal when three interruptions occur during a length of time lasting less than 1 second within a 10-minute period. This makes it possible to detect unsafe contacts and loose contacts according to the requirements in practice.

The measurement result limits determined for the contact gap of PE conductor 10 can satisfy, in particular, the following condition:

$$0.01 \text{ V} < (UN-UPE2) < (UL-UN) \times 0.1$$

or $$0.01 \text{ V} < (UN-UPE2) < 50 \text{ V},$$

where UPE2 is the voltage of the protective conductor on load side 4 of switching contact 6 and is therefore its load-side potential.

It is especially advantageous if, at least on supply side 3 of the potential-measuring device, a connection is established from the potential of external conductor 8 or several external conductors and from the potential of neutral conductor 9 to the potential of protective conductor 10 via a voltage-dependent resistor 13 in each case, with the resistance decreasing as the voltage rises. This arrangement protects fault current measuring device 12 against false tripping in the event of overvoltages. The power supply unit and electronic components are also protected in a conventional manner. It is advantageous to connect a series resistor 14 upstream from voltage-dependent resistors 13 in order to protect voltage-dependent resistors 13 as well.

The above-described connector 1 can be installed in a wide variety of locations and implemented in a great many different embodiments. For example, it can be integrated into a stationary load unit with a cable connector. In this regard, the load is checked to see whether it is in good condition, including the supply conductors, when connected.

What is claimed is:

1. A connecting devices comprising:

a switching device for switching through or releasing a connection between conductors from a supply side to a load side of the connection device;

monitoring and control electronics for controlling the switching device as a function of information or measured data, the monitoring and control electronics being supplied with voltage;

potential-measuring devices on the supply side and/or the load side, the potential-measuring devices measuring conductor potentials continuously or at regular intervals, the switching device being activated if a measured potential falls short of or exceeds specific limits;

a fault current detection device for monitoring the conductors to be switched through, the fault current detection device capable of acting on the switching device; and a bus interface for the monitoring and control electronics, information and/or command data being present at the bus interface;

the monitoring and control electronics being capable of generating a signal when a connection between the conductors is briefly released or established a predetermined number of times within a predetermined period of time that is sufficient for detecting loose contacts, the monitoring and control electronics being capable of generating a signal if a predetermined number of interruptions corresponding to the loose contacts occurring during a length of time comparatively shorter than a predetermined longer period.

2. The connecting device as recited in claim 1 wherein the connecting device is a plug-in device for TT and TN networks.

3. The connecting device as recited in claim 1 wherein the monitoring and control electronics are capable of generating a signal if three interruptions occur during a length of time lasting less than one second withing a 10-minute period.

4. An connecting device as recited in claim 1 wherein the connecting device is built into a stationary load unit.

5. A connecting device, comprising:
   a switching device for switching through or releasing a connection between conductors from a supply side to a load side of the connection device;
   monitoring and control electronics for controlling the switching device as a function of information or measured data, the monitoring and control electronics being supplied with voltage;
   potential-measuring devices on the supply side and/or the load side, the potential-measuring devices measuring conductor potentials continuously or at regular intervals, the switching device being activated if a measured potential falls short of or exceeds specific limits;
   a fault current detection device for monitoring the conductors to be switched through, the fault current detection device capable of acting on the switching device; and
   a bus interface for the monitoring and control electronics, information and/or command data being present at the bus interface;
   the monitoring and control electronics being capable of generating a signal when a connection between the conductors is briefly released or established a predetermined number of times within a predetermined period of time that is sufficient for detecting loose contacts;
   wherein the conductors include an external conductor, a neutral conductor and a protective conductor, and wherein the specific limits for the potential measurement results obtained by the potential-measuring devices satisfy the condition:

$0.02 < (UN-UPE1) < (UL-UN) \times 0.1$ or $0.01 < (UN-UPE1) < 50V,$ wherein UL represents the voltage of the external conductor, UN represents the voltage of the neutral conductor, and UPE1 represents the voltage to reference potential of the protective conductor on the supply side.

6. A connecting device, comprising:
   a switching device for switching through or releasing a connection between conductors from a supply side to a load side of the connection device;
   monitoring and control electronics for controlling the switching device as a function of information or measured data, the monitoring and control electronics being supplied with voltage;
   potential-measuring devices on the supply side and/or the load side, the potential-measuring devices measuring conductor potentials continuously or at regular intervals, the switching device being activated if a measured potential falls short of or exceeds specific limits;
   a fault current detection device for monitoring the conductors to be switched through, the fault current detection device capable of acting on the switching device; and
   a bus interface for the monitoring and control electronics, information and/or command data being present at the bus interface;
   the monitoring and control electronics being capable of generating a signal when a connection between the conductors is briefly released or established a predetermined number of times within a predetermined period of time that is sufficient for detecting loose contacts;
   wherein the conductors include an external conductor, a neutral conductor and a protective conductor, and wherein the specific limits for the potential measurement results obtained by the potential-measuring devices satisfy the condition:

$0.02 < (UN-UPE2) < (UL-UN) \times 0.1$ or $0.01 < (UN-UPE2) < 50V,$ wherein UL represents the voltage of the external conductor, UN represents the voltage of the neutral conductor, and UPE2 represents the voltage to reference potential of the protective conductor on the load side.

7. A connecting device, comprising:
   a switching device for switching through or releasing a connection between conductors from a supply side to a load side of the connection device;
   monitoring and control electronics for controlling the switching device as a function of information or measured data, the monitoring and control electronics being supplied with voltage;
   potential-measuring devices on the supply side and/or the load side, the potential-measuring devices measuring conductor potentials continuously or at regular intervals, the switching device being activated if a measured potential falls short of or exceeds specific limits;
   a fault current detection device for monitoring the conductors to be switched through, the fault current detection device capable of acting on the switching device; and
   a bus interface for the monitoring and control electronics, information and/or command data being present at the bus interface;
   the monitoring and control electronics being capable of generating a signal when a connection between the conductors is briefly released or established a predetermined number of times within a predetermined period of time that is sufficient for detecting loose contacts;
   at least one voltage-dependent resistor, and wherein the conductors include at least one external conductor, a neutral conductor and a protective conductor, the voltage-dependent resistor forming a connection at least one the supply side of the potential-measuring device, from the at least one external conductor and from the neutral conductor to the protective conductor, the resistance of the voltage-dependant resistor decreasing as the voltage rises.

8. The connecting device as recited in claim 7 wherein a series resistor is connected upstream of each of the voltage-dependant resistors.

* * * * *